US00RE43351E

(19) United States
(12) Reissued Patent
Jordan, Jr.

(10) Patent Number: US RE43,351 E
(45) Date of Reissued Patent: May 8, 2012

(54) CREDIT CARD VALIDATION FOR AN INTERACTIVE WIRELESS NETWORK

(75) Inventor: Royce D. Jordan, Jr., Winder, GA (US)

(73) Assignee: Dono Tech Services LLC, Las Vegas, NV (US)

(21) Appl. No.: 11/477,126

(22) Filed: Jun. 29, 2006
(Under 37 CFR 1.47)

Related U.S. Patent Documents

Reissue of:
(64) Patent No.: 6,755,342
Issued: Jun. 29, 2004
Appl. No.: 10/036,711
Filed: Dec. 31, 2001

(51) Int. Cl.
*H04M 3/00* (2006.01)
(52) U.S. Cl. ..... 235/380; 705/39; 455/406
(58) Field of Classification Search ..... 235/380; 705/39, 44; 455/406
See application file for complete search history.

(56) References Cited

U.S. PATENT DOCUMENTS

| | | | |
|---|---|---|---|
| 4,776,003 | A | 10/1988 | Harris |
| 5,559,800 | A | 9/1996 | Mousseau et al. |
| 5,850,599 | A | 12/1998 | Seiderman |
| 6,023,682 | A | 2/2000 | Checchio |
| 6,208,978 | B1 | 3/2001 | Walker et al. |
| 6,219,694 | B1 | 4/2001 | Lazaridis et al. |
| 6,418,305 | B1 | 7/2002 | Neustein |
| 6,505,046 | B1 | 1/2003 | Baker |
| 6,755,342 | B1 | 6/2004 | Jordan, Jr. |
| 2002/0077974 | A1 | 6/2002 | Ortiz |
| 2002/0077993 | A1 | 6/2002 | Immonen et al. |
| 2002/0107791 | A1 | 8/2002 | Nobrega et al. |
| 2003/0119478 | A1 | 6/2003 | Nagy et al. |
| 2003/0169727 | A1 | 9/2003 | Curry et al. |
| 2004/0143500 | A1 | 7/2004 | Lopez et al. |

OTHER PUBLICATIONS

US PG Pub No. 2002/0077974 A1.*

* cited by examiner

*Primary Examiner* — Daniel Hess
(74) *Attorney, Agent, or Firm* — Connolly Bove Lodge & Hutz LLP

(57) ABSTRACT

An apparatus and method for validating a credit card over a wireless network. The apparatus includes a gateway for sending a credit card validation reply message to a wireless device in response to receiving a credit card validation request message from the wireless device, the request message including credit card information for identifying a credit card to be validated. The method includes sending a first credit card validation request message to a gateway from a wireless device, the first request message including credit card information for identifying a credit card to be validated; sending a second credit card validation request message and the credit card information from the gateway over an external network in communication with the gateway to a credit card validation service provider for processing the credit card information; receiving by the gateway a first credit card validation reply message from the credit card validation service provider over the external network; and sending a second credit card validation reply message from the gateway to the wireless device.

77 Claims, 3 Drawing Sheets

CREDIT CARD VALIDATION FOR AN INTERACTIVE WIRELESS NETWORK

Matter enclosed in heavy brackets [ ] appears in the original patent but forms no part of this reissue specification; matter printed in italics indicates the additions made by reissue.

BACKGROUND

*Notice: More than one reissue application has been filed for the reissue of U.S. Pat. No. 6,755,342. The reissue application numbers are the present application, 11/424,176 and 13/424,889, which is a continuation reissue application from 11/424,176, both of which are reissues of U.S. Pat. No. 6,755,342.*

This invention relates to an interactive wireless network and, in particular, to credit card validation over an interactive network.

Credit card validation requires a predetermined arrangement with various credit card validation agencies. For example, Internet online vendors and consumers use credit card validation services such as PAYPAL to enable users (e.g., vendors or consumers) with an e-mail address to send and receive credit card payments online. The PAYPAL validation service uses existing infrastructures of bank accounts and credit cards to create a global real-time payment for its users. There are, however, no credit card validation services that provide a communication link over an interactive wireless network for subscribers to the network. For example, there are no credit card validation services that allow a user to obtain credit card validation using a wireless device over an interactive wireless network without requiring specialized applications and integration. Therefore, there is a need in the art to provide a wireless credit card validation service that operates over an interactive wireless network that allows a wireless user to obtain credit card verification via an interactive message without requiring specialized application development.

SUMMARY

According to one aspect the invention provides an apparatus for validating a credit card over a wireless network. The apparatus includes a gateway for sending a credit card validation reply message to a wireless device in response to receiving a credit card validation request message from the wireless device, the request message including credit card information for identifying a credit card to be validated.

Another aspect of the invention provides a method of validating a credit card over a wireless network. The method includes sending a first credit card validation request message to a gateway from a wireless device, the first request message including credit card information for identifying a credit card to be validated; sending a second credit card validation request message from the gateway over an external network in communication with the gateway to a credit card validation service provider for processing the credit card information; receiving by the gateway a first credit card validation reply message from the credit card validation service provider over the external network; and the gateway, sending a second credit card validation reply message to the wireless device.

A further aspect of the invention provides a method for validating a credit card over a wireless network. The method includes processing credit card information associated with a credit card to be validated at a gateway, the gateway sending a credit card validation reply message to a wireless device in response to receiving a credit card validation request message from the wireless device, the request message including the credit card information for identifying the credit card to be validated; wherein, the credit card information is processed at the gateway by a software application developed independently of external credit card validation processes provided remotely from the gateway.

These and various other aspects of the invention are pointed out with particularity in the claims annexed hereto and forming a part hereof. For a better understanding of the invention, however, reference should be made to the drawings which form a further part hereof, and to the accompanying descriptive matter, in which there are illustrated and described specific examples of an apparatus, system and method in accordance with the invention.

DESCRIPTION

In one embodiment, the present invention relates to a credit card validation system and method for providing credit card validation services over an interactive wireless network. The credit card validation system interfaces with a two-way wireless device. The wireless device communicates with an interactive wireless communications system. The wireless device receives credit card information such as credit card number and expiration date from a user and transmits a credit card validation request message over a wireless network to a gateway. In one embodiment the credit card information is transmitted from the gateway to a credit card validation service provider for processing the credit card information. The validation service provider sends a validation reply message to the gateway indicating whether the credit card has been approved. The gateway receives the validation reply message from the credit card validation service provider and transmits a validation reply message to the wireless device. In one embodiment, the credit card validation system includes a wireless device interfaced with a keypad or a credit card swipe reader.

In one embodiment, information from the wireless device is communicated to a wireless network and to one or more gateways and to an external network such as the Internet. The gateways allow different systems, i.e., the Internet or other wide area network and the wireless network to communicate with each other. In one embodiment, the gateway functions as an interface between a wireless device such as an interactive pager and the Internet.

In one embodiment, the interactive wireless device is an interactive pager and accepts credit card information from an integral keyboard. In one embodiment, the wireless device accepts credit card information from various external devices such as an external keypad, a credit card swipe reader, a contact smart card, a contactless smart card, infrared, radio frequency (RF), magnetic induction, and the like.

Figure 1:
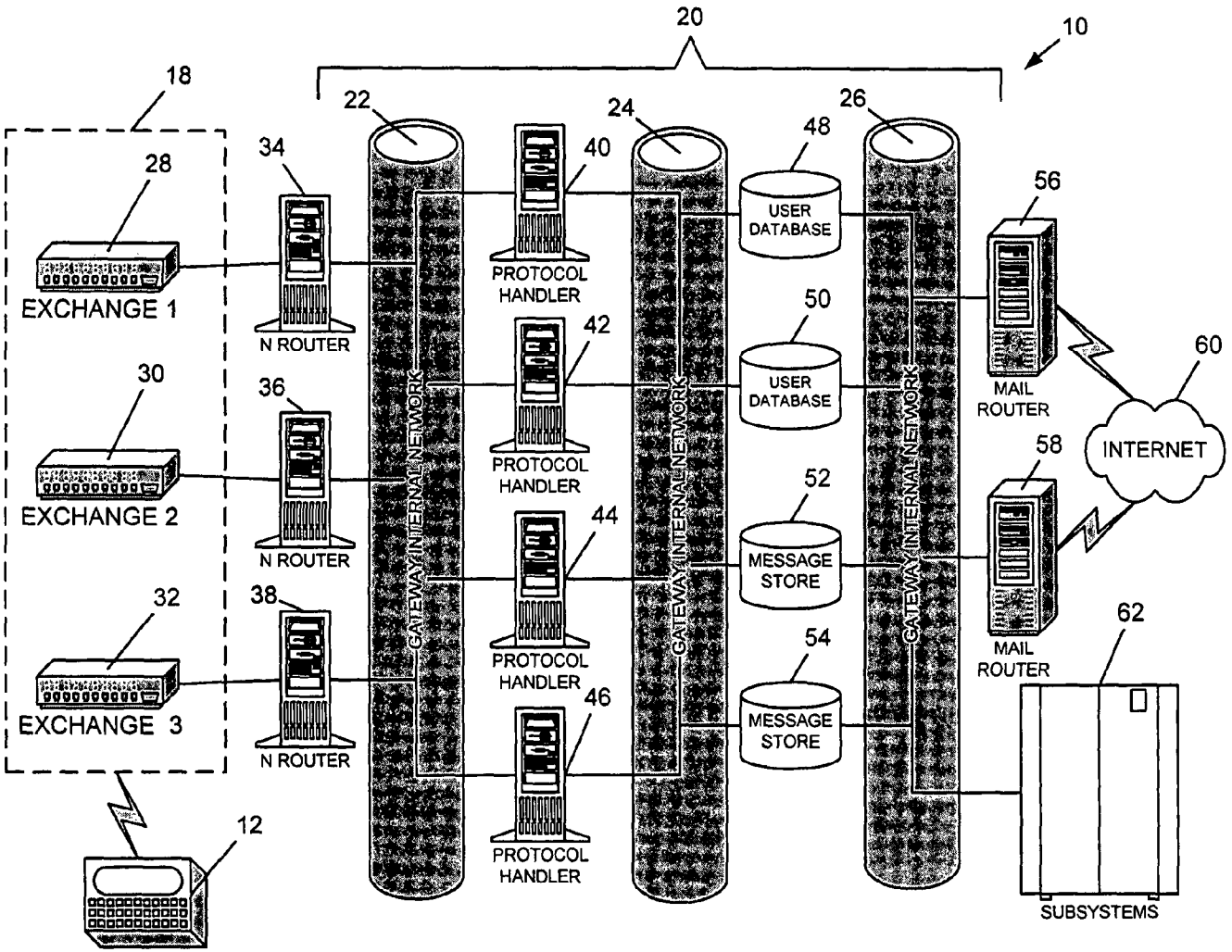
FIG. 1 is a schematic drawing of one embodiment of an interactive wireless system according to the invention.

FIG. 1 illustrates one embodiment of the components of an interactive wireless system 10 according to the present invention. A wireless device 12 such as a pager communicates with a wireless communication network 18. An example of the wireless communications network 18 uses the MOBITEX® technology of the Cingular Interactive Intelligent Wireless Network service provided by Cingular Wireless. The features of the present invention may be implemented, e.g., by Cingular Wireless's IM+ Interactive Messaging Service.

The MOBITEX® network is a two-way wireless data service that can be connected with other complementary networks. A wireless data service such as the MOBITEX® network includes a hierarchy of communications systems that can provide nationwide wireless service through a network of base stations and local switches under the control of higher order regional switches or exchanges. The wireless device 12 may operate with a wireless communications system using an over-the-air protocol such as HP98 or the Blackberry protocol developed by RIM (Research in Motion).

In one embodiment, the wireless device 12 is a wireless interactive pager capable of interactive messaging between the pager and the wireless communication network 18. In other embodiments, the wireless device 12 can include, for example, a Personal Digital Assistant (PDA), a wireless telephone, a wireless personal computer, a wireless modem or any wireless device that is adapted to communicate with the wireless network 18. Interactive messaging provides, for example, a way of communicating with the ability of sending and receiving text messages. In one embodiment, the interactive pager displays the user's messages to and from other interactive messaging users on a screen. The interactive pages can send and receive Internet e-mail, send messages to a fax machine and send text-to-voice messages to a telephone. Additional features of the interactive messaging allows a user to retrieve and manage all messages, along with content from the Internet, including e-mail.

Gateway 20 processes data received, e.g., from the Internet 60 for use in wireless communication network 18. The components of gateway 20 may be connected over an internal network 22, 24, 26, which may be a local area network (LAN). One or more wireless network exchanges such as MOBITEX® regional switches 28, 30, 32, which may be at separate locations, communicate with gateway 20 through Nrouters 34, 36, 38. The communication between regional switches 28, 30, 32 and Nrouters 34, 36, 38 may use an X.25 protocol. Up to two dual-ported connectivity cards, e.g., those manufactured by Eicon Networks, can be placed in each Nrouter, permitting a total of four Fast-Sequenced Transport (FST) connections per Nrouter. Gateway 20 can handle, for example, up to 255 Nrouters.

The communications received by Nrouters 34, 36, 38 are processed by a series of protocol handlers 40, 42, 44, 46. The protocol handlers 40, 42, 44, 46 communicate with the Nrouters 34, 36, 38 using X-sockets over internal network 22. Such sockets are, for example, point-to-point, two-way software communications interfaces that direct the protocol handlers to access the internal network by creating a communications end-point or socket and returning a file descriptor with which to access that socket. The underlying protocol for packaging and decoding text messages sent by wireless devices and received by the gateway is Simple Mail Transport Protocol (SMTP).

An unlimited number of protocol handlers may be employed. Each protocol handler may include up to five protocol processes, which may be any combination of HP98, HP99 or HPID-4 processes. Each protocol processor may back up the other protocol processors automatically. The protocols handled by protocol handlers 40, 42, 44, 46 may specify that message storage and internal email access may be handled by the UNIX standard Network File System (NFS) distributed file system from SUNSOFT, which allows data to be shared across the network regardless of the protocol. Each protocol handler maintains a database cache, i.e., a small, fast memory holding recently accessed data, to speed up internal network communications and to limit database access requests over the LAN.

Protocol handlers 40, 42, 44, 46 process information contained in user database machines, e.g., user database 48, user database backup 50, message store 52 and message store backup 54. The protocol machines communicate with the database machines using X-sockets over internal network 24. The database machines contain an interface to content addressable memory (CAM) (not shown) for updating information, e.g., user account information and status. Multiple backup machines may be used in gateway 20, each being synched automatically by sockets communications.

The user databases of the gateway 20 may be configured with a directory structure. Every user account stored in the user database has a unique identifier such as a MOBITEX® Access Number.

The results of protocols processed by protocol handlers 40, 42, 44, 46 using data from the user database machines are communicated externally to gateway 20 via network 26. An Internet mail router 56 and Internet mail router backup 58 connected to the internal network handle inbound and outbound communications traffic with an external network such as the Internet 60, as well as X-sockets traffic. If necessary, a separate X-sockets machine and backup machine (not shown) can be added. The transport protocol for communications over the Internet may be, e.g., TCP/IP or TELNET for remote login.

The internal network is also connected to wireless network subsystems 62 that communicate through wireless network 18. Examples of wireless network subsystems are an Interactive Voice Response (IVR) system which processes remote entries by a user from a touch tone telephone to query a database and obtain computerized voice responses, and a wireless paging system using an advanced XTAP protocol.

The wireless communication gateway may be configured from a standard Santa Cruz Operation (SCO) UNIX system, with the web access program being Windows NT by Microsoft. The system may use both TCP/IP and UDP for communications, and hypertext markup language (HTML) may be used to support Internet web browsers, including those provided by Netscape and Microsoft. The computer language used by the gateway components may be in the C programming language, java or HTML. The message delivery features of the present invention may be implemented in the C programming language.

The gateway as configured in such a wireless communications system includes a mailbox for the user of the wireless interactive device, e.g., in message store 52. For example, when a sender sends a text message over the Internet to a user of a wireless device, the gateway 20 stores the message in the user's mailbox and handles the communications and transmissions protocols to deliver the message over the wireless network. The message can include credit card information and credit card validation requests and replies. Based on information about the user in the user database, the gateway 20 determines the user's wireless device type, and the gateway 20 is programmed to handle a variety of protocols for different wireless devices. The gateway 20 can access profile information, such as user preferences, for the user stored in the user database. The gateway 20 also uses information in the user database to ensure that the user is a valid subscriber to the wireless service and to maintain billing information based on usage. The gateway 20 performs the important function of managing the amount of data flow in the internal network and the volume of communications traffic over the wireless network, which has a limited bandwidth and which handles limited size data packets.

In operation, the gateway 20 provides credit card validation services to a subscriber to the gateway 20 by way of a standard wireless mail package, for example. The subscriber (e.g., user) to the gateway 20 can use wireless devices 12 such as pagers to transmit credit card validation request messages to the gateway 20 and receive credit card validation reply messages from the gateway 20 without developing their own credit card validation interfaces. The message includes the credit card information such as the card number and the expiration date of the credit card to be validated. In one embodiment, the credit card information is specified in the subject of an e-mail message. The validation reply message is then returned to the subscriber's wireless device 12 in the form of an e-mail message, for example. The user, therefore, need only subscribe to the gateway 20 and need not subscribe to a separate credit card validation service such as PAYPAL, for example The credit card validation function can be implemented at the gateway 20 using a custom software application or via standard Internet e-mail to send a message to a predefined validation address associated with the gateway 20. The software application developers do not need to have any specific knowledge of the actual validation process that is provided through the gateway 20. The software application developers can thus concentrate their efforts in developing applications for processing the credit card validation messages between the wireless device 12 and the credit card validation service provider without the burden or overhead of knowing the specific credit validation process used by an external provider. Accordingly, in one embodiment, the credit card validation function for processing credit card validation request messages at the gateway 20 can be implemented by software application developers independently of the external credit card validation process. Therefore, the software applications for processing the credit card information for identifying a credit card to be validated can operate independently of the credit card service provider validation process.

In one embodiment, the gateway 20 functions as a reseller of credit card validation services and works in conjunction with a third party credit card validation service. Because the credit card validation service is provided to the gateway subscribers, there will be much less credit card validation traffic on the gateway 20 and thus the user can access credit card validation information at a much improved processing rate.

Figure 2:
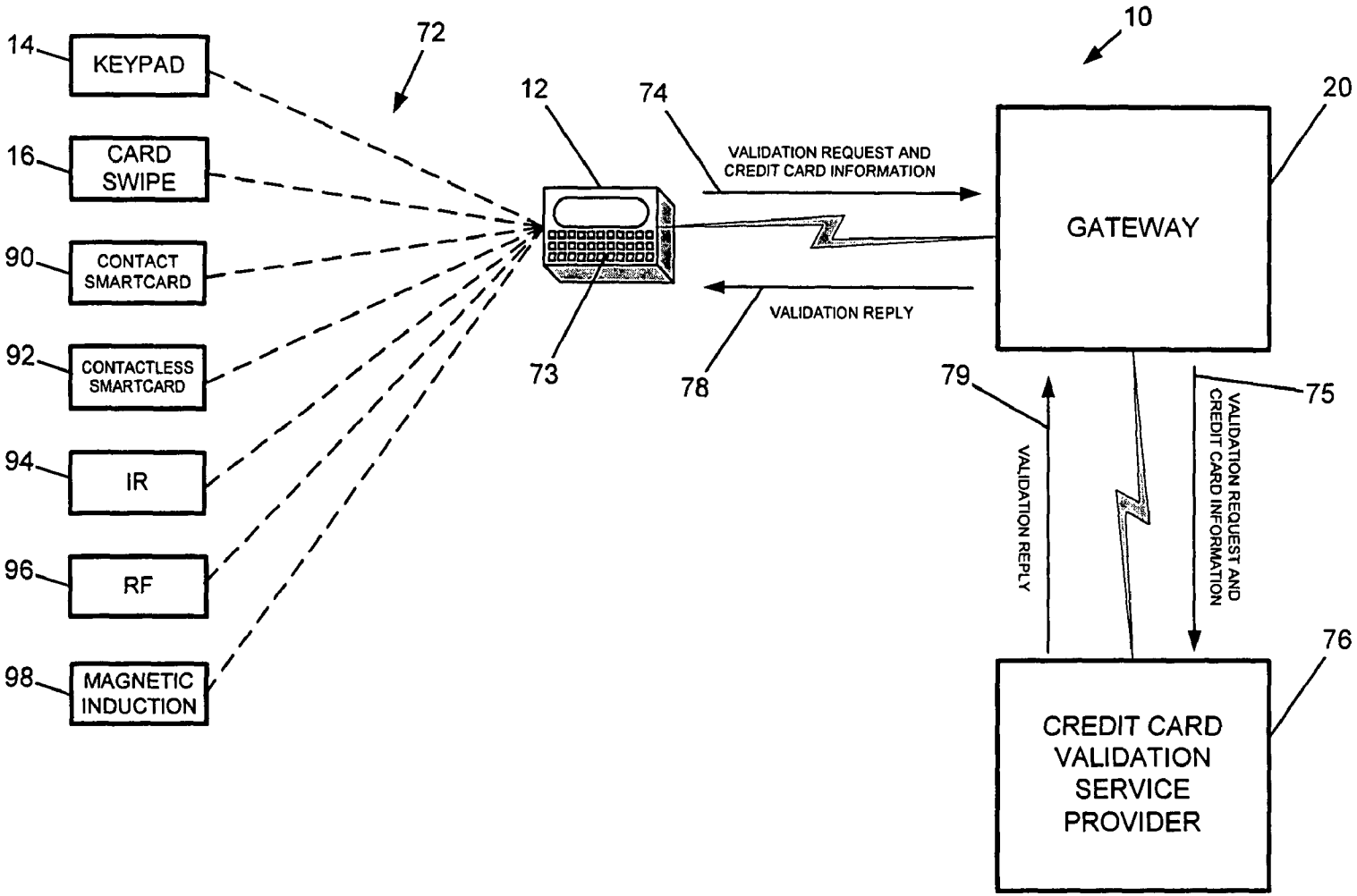
FIG. 2 is a block diagram of one embodiment of an interactive wireless credit card validation system according to the invention.

Turning now to FIG. 2, where one embodiment of a credit card validation system 70 is illustrated. A user provides credit card information 72 to be validated to the wireless device 12. The wireless device 12 sends a credit card validation request message 74 including the credit information (e.g., credit card number and the expiration date) to the gateway 20. The gateway 20 transmits a credit card validation request message 75 and the credit card information to a third party credit card validation service provider 76 for processing the credit card information. Once the credit card information is processed the third party credit card validation service provider 76 returns a validation reply message 79 indicating whether or not to authorize the credit card. Accordingly, the gateway 20 provides a validation reply message 78 to the wireless device 12.

In one embodiment, the wireless device 12 is an interactive pager and the credit information can be entered via the interactive pager keyboard 73. In one embodiment, the wireless device can be interfaced to various external devices such as an external keypad 14, a card swipe reader 16, a contact smart card 90, a contactless smart card 92, infrared 94, radio frequency (RF) 96, magnetic induction 98, and the like. The wireless device 12 accepts the credit card information from the external interfaces 14, 16, 90, 92, 94, 96, 98 and transmits the credit card information and a validation request to the wireless communication network 18 and onto the gateway 20 for validation.

Figure 3:
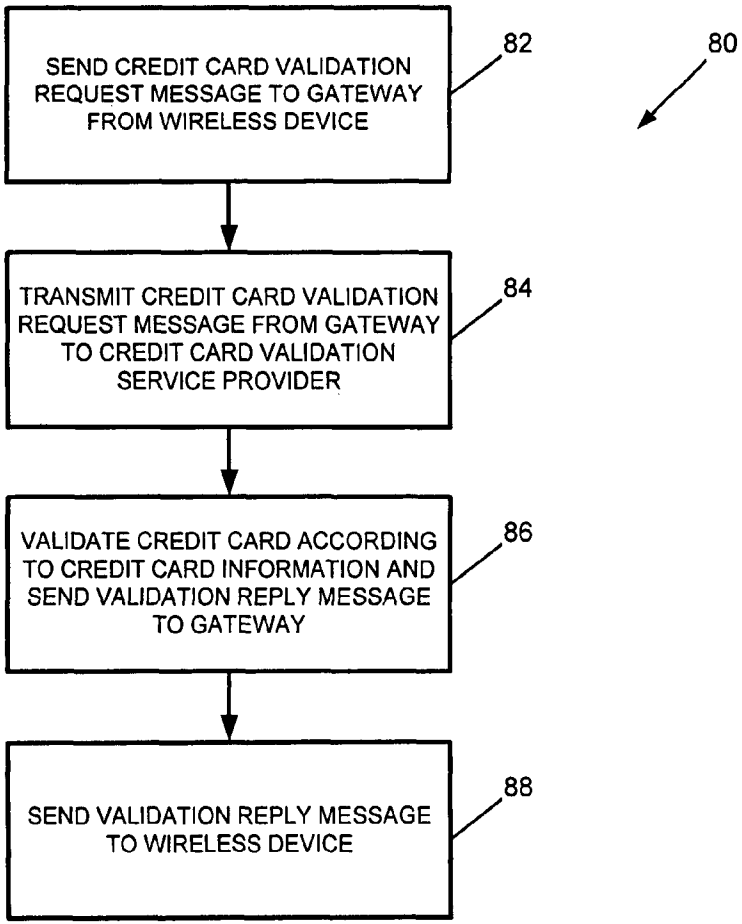
FIG. 3 is a flow diagram showing one embodiment of an implementation of an interactive wireless credit card validation feature of the invention.

Turning now to FIG. 3, where one embodiment of a flow diagram 80 showing how the credit card validation may be implemented. At block 82, using the wireless device 12 the user 72 sends a credit card validation request message including credit card information to the gateway 20. The gateway 20 recognizes the user 72 and receives the validation request message and credit card information 74. At block 84, the gateway 20 transmits a validation request message including the credit card information 74 to a third party credit card validation service 76 provider. At block 86, the third party credit card validation service provider 76 validates the credit card information 74 and returns a validation reply to the gateway 20. At block 88, the gateway sends the validation reply 78 to the user via the wireless device 12. Accordingly, the user 72 can validate the credit card information 74 through the gateway 20 without subscribing to the third party validation service 76. In one embodiment, the gateway 20 provider purchases the credit card validation services from the third party validation service provider 76 and resells the validation service to the user 72.

In use, for example, a vendor can take a customer's credit card information and provide the information to the wireless device 12. The vendor provides the credit card information to the wireless device through the various interfaces. The wireless device 12 transmits the credit card information and a validation request message to the wireless communication network 18 and onto the gateway 20. The credit card information is then validated and the gateway 20 sends a response containing the validation reply as a text message back to the display of the wireless device 12. The validation reply also can be displayed on the keypad 14, the credit card swipe reader 16 and any of the other external interfaces if they are equipped with a display or validation indicator.

In one embodiment, for example, a wireless user can obtain credit card validation information via an interactive message with no application development. The wireless user can utilize the wireless device 12 to send an interactive message to the wireless network 18 as follows:

To: creditvalidation

Subject: <creditcard number> <expirationdate> <amount>

Where:

<creditcard number> is the number to be validated;

<expiration date> is the expiration date of the card; and

<amount> is an optional field and is the amount to check if valid

For example:

To: creditvalidation

Subject: 3838939391233434 01/02 50.00

The wireless network provides the following response to the wireless user, for example:

Card: 3838939391233434 Expiration Date: 01/02

Is Valid for $50.00

Accordingly, the wireless user can validate credit cards wirelessly remote from their normal place of business, for example. The wireless user can later clear the credit card via the conventional credit facility located back at the wireless user's normal place of business.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptions without departing from the scope and spirit of the present invention as defined by the appended claims.

What is claimed is:

1. An apparatus for validating a credit card over a wireless data network, the apparatus comprising:

a wireless communication gateway [in communication] *configured to communicate* with a wireless data network, the gateway configured [for processing] *to process* credit card validation data *to be* received from an external network and [for sending] *configured to send* a credit card validation reply message to a wireless device in communication with the wireless data network in response to receiving a credit card validation request message from the wireless device, the request message including credit card information [for identifying] *to identify* a credit card to be validated;

wherein the gateway comprises a database for storing the credit card validation reply message; and wherein the database has a directory structure for associating the wireless device with the credit card validation reply message.

2. The apparatus of claim 1, wherein the gateway [transmits] *is configured to transmit* the credit card validation request message over the external network to a credit card validation service provider [for processing] *to process* the credit card information.

3. The apparatus of claim 2, wherein the external network is the Internet.

4. The apparatus of claim 1, wherein the credit card validation request message is a text message.

5. The apparatus of claim 1, wherein the credit card validation request message is *to be* sent via e-mail to a predetermined validation e-mail address.

6. The apparatus of claim 5, wherein the credit card information is *to be* provided in a subject portion of the e-mail message.

7. The apparatus of claim 1, wherein the credit card information includes a credit card number of the credit card to be validated.

8. The apparatus of claim 1, wherein the credit card information includes a credit card expiration date of the credit card to be validated.

9. The apparatus of claim 1, wherein the credit card information includes an identifier associated with the credit card to be validated.

10. The apparatus of claim 1, wherein the credit card validation reply message is a text message.

11. The apparatus of claim 1, wherein the credit card validation reply message is *to be* sent via e-mail to the wireless device.

12. The apparatus of claim 1, wherein the wireless device is a pager.

13. The apparatus of claim 1, wherein the wireless device is *configured to be* interfaced to a keypad.

14. The apparatus of claim 1, wherein the wireless device [in] *is configured to be* interfaced to a credit card swipe reader.

15. A method of validating a credit card over a wireless data network, the method comprising:

sending a first credit card validation request message to a wireless communication gateway in communication with a wireless data network from a wireless device in communication with the wireless data network, the gateway configured for processing credit card validation data received from an external network, the first request message including credit card information for identifying a credit card to be validated;

sending a second credit card validation request message and the credit card information from the gateway over the external network in communication with the gateway to a credit card information validation service provider for processing the credit card information;

receiving by the gateway a first credit card validation reply message from the credit card validation service provider over the external network;

sending a second credit card validation reply message from the gateway to the wireless device;

storing the first credit card validation reply message in a database associated with the gateway; and associating a second wireless device with the first credit card validation reply message in a directory structure of the database.

16. The method of claim 15, further comprising storing the second credit card validation reply message in a database associated with the gateway.

17. The method of claim 16, further comprising associating a second wireless device with the second credit card validation reply message in a directory structure of the database.

18. The method of claim 15, wherein sending the second request message from the gateway over an external network in communication with the gateway for processing the credit card information further comprises transmitting the second request message to the Internet.

19. The method of claim 15, wherein sending a first credit card validation request message further comprises sending a text message.

20. The method of claim 15, wherein sending a second credit card validation request message further comprises sending the credit card information via e-mail to a predetermined validation e-mail address.

21. The method of claim 20, wherein sending credit card information further comprises sending the credit card validation information in a subject portion of the e-mail message.

22. The method of claim 15, wherein sending credit card information further comprises sending a credit card number of the credit card to be [valid] *validated*.

23. The method of claim 15, wherein sending credit card information further comprises sending a credit card expiration date of the credit card to be validated.

24. The method of claim 15, wherein sending credit card information further comprises sending an identifier associated with the credit card to be validated.

25. The method of claim 15, wherein sending a first credit card validation reply message further comprises sending a text message.

26. The method of claim 15, wherein sending a second credit card validation reply message further comprises sending an e-mail message to the wireless device.

27. The method of claim 15, wherein sending a first credit card validation request message from a wireless device further comprises sending the first credit card validation request message from a pager.

28. The method of claim 15, wherein sending a second credit card validation reply message to a wireless device further comprises sending the second credit card validation reply message to a pager.

29. The method of claim 15, wherein sending a first credit card validation request message further comprises sending a first credit card validation message that is independent of a credit card service provider validation process.

30. The method of claim 29, wherein software applications for processing credit card information for identifying a credit card to be validated operate independently of the credit card service provider validation process.

31. A method for validating a credit card over a wireless data network, the method comprising:

processing credit card information associated with a credit card to be validated at a wireless communication gateway *to be* in communication with a wireless data network, the gateway configured [for processing] *to process* credit card validation data *to be* received from an external network, the gateway [sending] *to send* a credit card validation reply message to a wireless device in communication with the wireless network in response to receiving a credit card validation request message from the wireless device, the request message including the credit card information for identifying the credit card to be validated;

wherein[,] the credit card information is *to be* processed at the gateway by a software application developed independently of external credit card validation processes *to be* provided remotely from the gateway; and storing the credit card validation reply message in a database associated with the gateway;

wherein storing further comprises storing the credit card validation reply message in a database that includes a directory structure for associating the wireless device with the credit card validation reply message.

32. The method of claim 31, further comprising transmitting the credit card validation request message from the gateway over the external network to the credit card validation service provider [for processing] *to process* the credit card information.

33. The method of claim 32, wherein transmitting the credit card validation request message further comprises transmitting over the Internet.

34. The method of claim 31, wherein processing the credit card validation request message further comprises processing a text message.

35. The method of claim 31, further comprising sending the credit card validation request message via e-mail to a predetermined validation e-mail address.

36. The method of claim 35, further comprising providing the credit card information in a subject portion of the e-mail message.

37. The method of claim 31, further comprising providing a credit card number of the credit card to be validated in the credit card information.

38. The method of claim 31, further comprising providing a credit card expiration date of the credit card to be validated in the credit card information.

39. The method of claim 31, further comprising providing an identifier associated with the credit card to be validated in the credit card information.

40. The method of claim 31, wherein processing the credit card validation reply message further comprises processing a text message.

41. The method of claim 31, further comprising sending the credit card validation reply message via e-mail to the wireless device.

42. The method of claim 31, further comprising receiving the credit card information by the gateway from a pager.

43. A method of validating a credit card over a wireless data network, the method comprising:

sending a first credit card validation request message to a wireless communication gateway in communication with a wireless data network from a wireless device in communication with the wireless data network, the gateway configured for processing credit card validation data received from an external network, the first request message including credit card information for identifying a credit card to be validated;

sending a second credit card validation request message and the credit card information from the gateway over the external network in communication with the gateway to a credit card information validation service provider for processing the credit card information;

receiving by the gateway a first credit card validation reply message from the credit card validation service provider over the external network;

sending a second credit card validation reply message from the gateway to the wireless device; and storing the second credit card validation reply message in a database associated with the gateway, *wherein the second credit card validation reply message is associated in the database with a second wireless device*.

44. The method of claim 43, [further comprising associating a] *wherein the* second wireless device *is associated* with the second credit card validation reply message in a directory structure of the database.

*45. A method of validating a credit card over a wireless date network, the method comprising:*

*receiving, at a gateway, a first credit card validation request message from a wireless device via a wireless date network, the gateway to process credit card validation data received from an external network, the first request message including credit card information to identify a credit card to be validated;*

*sending a second credit card validation request message and the credit card information from the gateway over the external network to a credit card information validation service provider to process the credit card information;*

*receiving by the gateway a first credit card validation reply message from the credit card validation service provider over the external network;*

*sending a second credit card validation reply message from the gateway to the wireless device;*

*storing the first credit card validation reply message in a database associated with the gateway; and*

*associating a second wireless device with the first credit card validation reply message in a directory structure of the database.*

*46. The method of claim 45, further comprising storing the second credit card validation reply message in a database associated with the gateway.*

*47. The method of claim 46, further comprising associating a second wireless device with the second credit card validation reply message in a directory structure of the database.*

*48. The method of claim 45, wherein sending the second request message from the gateway over an external network in communication with the gateway to process the credit card information further comprises transmitting the second request message to the Internet.*

*49. The method of claim 45, wherein sending a first credit card validation request message further comprises sending a text message.*

*50. The method of claim 45, wherein sending a second credit card validation request message further comprises sending the credit card information via e-mail to a predetermined validation e-mail address.*

*51. The method of claim 50, wherein sending credit card information further comprises sending the credit card validation information in a subject portion of the e-mail message.*

*52. The method of claim 45, wherein sending credit card information further comprises sending a credit card number of the credit card to be validated.*

*53. The method of claim 45, wherein sending credit card information further comprises sending a credit card expiration date of the credit card to be validated.*

*54. The method of claim 45, wherein sending credit card information further comprises sending an identifier associated with the credit card to be validated.*

*55. The method of claim 45, wherein sending a first credit card validation reply message further comprises sending a text message.*

*56. The method of claim 45, wherein sending a second credit card validation reply message further comprises sending an e-mail message to the wireless device.*

*57. The method of claim 45, wherein said first credit card validation request message is independent of a credit card service provider validation process.*

*58. The method of claim 57, wherein software applications for processing credit card information to identify a credit card to be validated are to operate independently of the credit card service provider validation process.*

*59. A method of validating a credit card over a wireless data network, the method comprising:*

*receiving, by a gateway, a first credit card validation request message from a wireless device via a wireless data network, the gateway configured to process credit card validation data received from an external network, the first request message including credit card information to identify a credit card to be validated;*

*sending a second credit card validation request message and the credit card information from the gateway over the external network in communication with the gateway to a credit card information validation service provider to process the credit card information;*

*receiving by the gateway a first credit card validation reply message from the credit card validation service provider over the external network;*

*sending a second credit card validation reply message from the gateway to the wireless device; and*

*storing the second credit card validation reply message in a database associated with the gateway, wherein the second credit card validation reply message is associated in the database with a second wireless device.*

*60. The method of claim 59, wherein the second wireless device is associated with the second credit card validation reply message in a directory structure of the database.*

*61. A computer-readable storage medium containing software code that, if executed by a processor, causes the processor to perform operations comprising:*

*receiving a first credit card validation request message from a wireless device via a wireless data network, the first request message including credit card information to identify a credit card to be validate;*

*sending a second credit card validation request message and the credit card information over an external network to a credit card information validation service provider to process the credit card information;*

*receiving a first credit card validation reply message from the credit card validation service provider over the external network;*

*sending a second credit card validation reply message to the wireless device;*

*storing the first credit card validation reply message in a database; and*

*associating a second wireless device with the first credit card validation reply message in a directory structure of the database.*

*62. The medium of claim 61, further comprising software code such that the operations further comprise:*

*storing the second credit card validation reply message in a database.*

*63. The medium of claim 62, further comprising software code such that the operations further comprise:*

*associating a second wireless device with the second credit card validation reply message in a directory structure of the database.*

*64. The medium of claim 61, wherein sending the second request message over an external network further comprises transmitting the second request message to the Internet.*

*65. The medium of claim 61, wherein sending a first credit card validation request message further comprises sending a text message.*

*66. The medium of claim 61, wherein sending a second credit card validation request message further comprises sending the credit card information via e-mail to a predetermining validation e-mail address.*

*67. The medium of claim 66, wherein sending credit card information further comprises sending the credit card validation information in a subject portion of the e-mail message.*

*68. The medium of claim 61, wherein sending credit card information further comprises sending a credit card number of the credit card to be validated.*

*69. The medium of claim 61, wherein sending credit card information further comprises sending a credit card expiration date of the credit card to be validated.*

*70. The medium of claim 61, wherein sending credit card information further comprises sending an identifier associated with the credit card to be validated.*

*71. The medium of claim 61, wherein sending a first credit card validation reply message further comprises sending a text message.*

*72. The medium of claim 61, wherein sending a second credit card validation reply message further comprises sending an e-mail message to the wireless device.*

*73. The medium of claim 61, wherein said first credit card validation request message is independent of a credit card service provider validation process.*

*74. The medium of claim 73, wherein software applications for processing credit card information to identify a credit card to be validated are to operate independently of the credit card service provider validation process.*

*75. A computer-readable storage medium containing software code that, if executed by a processor, causes the processor to perform operations comprising:*

*receiving a first credit card validation request message from a wireless device via a wireless data network, the first request message including credit card information to identify a credit card to be validated;*

*sending a second credit card validation request message and the credit card information over an external network to a credit card information validation service provider to process the credit card information;*

*receiving a first credit card validation reply message from the credit card validation service provider over the external network;*

*sending a second credit card validation reply message to the wireless device; and*

*storing the second credit card validation reply message in a database, wherein the second credit card validation reply message is associated in the database with a second wireless device.*

*76. The medium of claim 75, wherein the second wireless device is associated with the second credit card validation reply message in a directory structure of the database.*

*77. A method of reselling credit card validation services, the method comprising:*

*arranging to purchase credit card validation services from a validation service provider;*

*receiving, from a wireless device of a subscriber, a first credit card validation request message via a wireless data network, the first request message including credit card information to identify a credit card to be validated;*

*sending a second credit card validation request message and the credit card information over an external network to said validation service provider to process the credit card information;*

*receiving a first credit card validation reply message from said validation service provider over the external network;*

*sending a second credit card validation reply message to the wireless device;*

*storing the first credit card validation reply message in a database; and*

*associating a second wireless device with the first credit card validation reply message in a directory structure of the database.*

* * * * *

UNITED STATES PATENT AND TRADEMARK OFFICE

CERTIFICATE OF CORRECTION

PATENT NO. : RE43,351 E
APPLICATION NO. : 11/477126
DATED : May 8, 2012
INVENTOR(S) : Jordan, Jr.

It is certified that error appears in the above-identified patent and that said Letters Patent is hereby corrected as shown below:

In Column 5, Line 22, delete "for example" and insert -- for example. --, therefor.

In Column 10, Line 28, in Claim 45, delete "date network," and insert -- data network, --, therefor.

In Column 10, Line 31, in Claim 45, delete "date network," and insert -- data network, --, therefor.

In Column 11, Line 58, in Claim 61, delete "validate;" and insert -- validated; --, therefor.

Signed and Sealed this
Twenty-fifth Day of September, 2012

David J. Kappos

David J. Kappos
*Director of the United States Patent and Trademark Office*